W. J. Sage,
Horse Power.

N° 38,421.   Patented May 5, 1863.

Witnesses
J. W. Coombs
J. W. Reed

Inventor
W. J. Sage
per Munn & Co.
Attorneys

UNITED STATES PATENT OFFICE.

W. J. SAGE, OF STEUBENVILLE, OHIO.

IMPROVEMENT IN HORSE-POWERS.

Specification forming part of Letters Patent No. 38,421, dated May 5, 1863.

*To all whom it may concern:*

Be it known that I, W. J. SAGE, of Steubenville, in the county of Jefferson and State of Ohio, have invented a new and Improved Horse-Power; and I do hereby declare that the following is a full, clear, and exact description of the same, reference being had to the accompanying drawings, making a part of this specification, in which—

Figure 1:
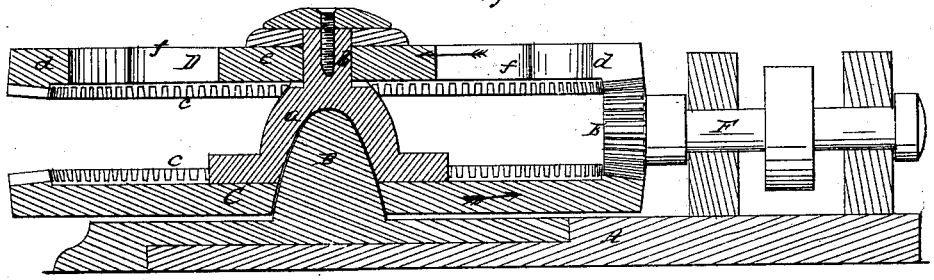
Figure 2:
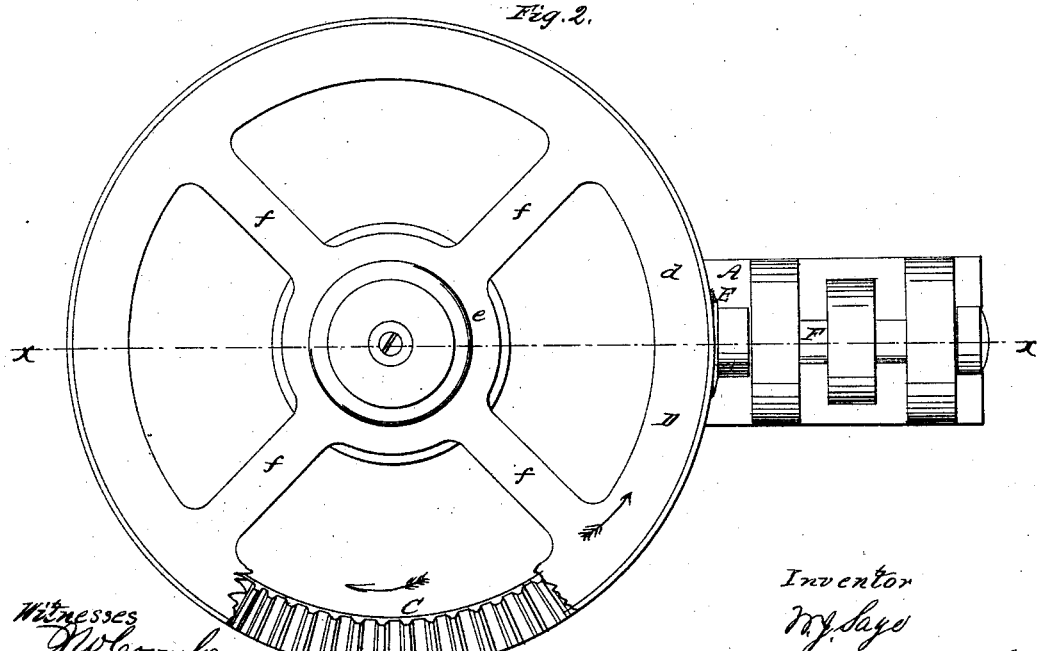

Figure 1 is a vertical central section of my invention, taken in the line $x$ $x$, Fig. 2; Fig. 2, a plan or top view of the same, partly in section.

Similar letters of reference indicate corresponding parts in the two figures.

This invention consists in the employment or use of two horizontal wheels provided with cogs which gear into a pinion, said wheels being placed one over the other and arranged in such a manner that the horse may act upon the lower wheel with his feet, and pull or draw upon the upper wheel, thereby acting in two different ways, and in the most efficient manner to propel machinery.

To enable those skilled in the art to fully understand and construct my invention, I will proceed to describe it.

A represents a bed-piece, on which a conical vertical projection B, is secured, and C is a horizontal wheel, the hub $a$ of which is fitted on the projection B, and allowed to turn freely thereon, as shown clearly in Fig. 1. The hub $a$ of the wheel at its upper part is of cylindrical form, as shown at $b$, and on this part $b$ a wheel, D, is fitted and allowed to turn freely, the wheel D being equal in diameter to C, and both wheels being provided with teeth $c$, the teeth of the upper wheel, D, being at its under side, and the teeth of the lower wheel, C, being on its upper side, as shown clearly in Fig. 1. The wheels C D both gear into a pinion, E, which is on a horizontal shaft, F, from which the power is taken. The lower wheel C is a solid one, so that the horse may walk upon it, but the upper wheel, D, is a skeleton one, or has its rim $d$ connected to a hub, $e$, by arms, $f$, as shown clearly in Fig. 2. The horse is placed within the wheel D, between two of its arms, $f$, and is attached to said wheel, and it will be seen that when the horse is started he will act upon the lower wheel, C, with his feet and rotate it while the upper wheel, D, will be rotated by the pull of the animal, the wheels C D rotating in reverse directions, as indicated by the arrows, and giving motion to the shaft F through the medium of the teeth $c$ and pinion E. By this arrangement, therefore, the horse exerts his power in two different ways, in order to operate the device, and a very simple and efficient horse-power is obtained.

Having thus described my invention, what I claim as new, and desire to secure by Letters Patent, is—

The combination of the two toothed wheels C D, pinion E, and shaft F, arranged to operate in the manner as and for the purpose herein set forth.

W. J. SAGE.

Witnesses:
 ALEX. DONALDSON,
 WM. K. PETERS.